United States Patent
Batta et al.

(10) Patent No.: US 10,055,581 B2
(45) Date of Patent: *Aug. 21, 2018

(54) LOCATING A WIRELESS COMMUNICATION ATTACK

(71) Applicant: SYMBOL TECHNOLOGIES, INC., Schaumburg, IL (US)

(72) Inventors: Puneet Batta, San Jose, CA (US); Jason T Harris, San Martin, CA (US); Trevor Miranda, San Jose, CA (US); Jacob Thomas, San Jose, CA (US)

(73) Assignee: Symbol Technologies, LLC, Holtsville, NY (US)

( * ) Notice: Subject to any disclaimer, the term of this patent is extended or adjusted under 35 U.S.C. 154(b) by 45 days.

This patent is subject to a terminal disclaimer.

(21) Appl. No.: 14/312,745

(22) Filed: Jun. 24, 2014

(65) Prior Publication Data
US 2015/0371038 A1   Dec. 24, 2015

(51) Int. Cl.
| G06F 11/00 | (2006.01) |
| G06F 21/55 | (2013.01) |
| H04W 12/12 | (2009.01) |
| H04N 7/18  | (2006.01) |

(52) U.S. Cl.
CPC ............ *G06F 21/55* (2013.01); *H04W 12/12* (2013.01); *G06F 2221/034* (2013.01); *H04L 2463/146* (2013.01); *H04N 7/183* (2013.01)

(58) Field of Classification Search
CPC . G06F 21/55; H04L 63/1408; H04L 63/1441; H04L 63/145; H04L 63/1416; H04W 12/12
USPC .......................................................... 726/23
See application file for complete search history.

(56) References Cited

U.S. PATENT DOCUMENTS

| 6,448,906 | B1 | 9/2002  | Nachtsheim et al. |
| 7,715,800 | B2 | 5/2010  | Sinha             |
| 8,104,679 | B2 | 1/2012  | Brown             |
| 8,386,381 | B1 | 2/2013  | Barton et al.     |
| 8,458,069 | B2 | 6/2013  | Adjaoute          |
| 8,479,267 | B2 | 7/2013  | Donley et al.     |
| 8,523,072 | B2 | 9/2013  | Randolph          |
| 8,695,879 | B1 | 4/2014  | Whytock           |

(Continued)

FOREIGN PATENT DOCUMENTS

WO       2013126747 A2      8/2013

OTHER PUBLICATIONS

International Search Report and Written Opinion for International Patent Application No. PCT/US2015/019629 dated Jun. 18, 2015.
(Continued)

*Primary Examiner* — Ali S Abyaneh
(74) *Attorney, Agent, or Firm* — Yuri Astvatsaturov

(57) ABSTRACT

A technique for locating a wireless communication attack includes monitoring of Bluetooth® communications activity by a Bluetooth® capable communication device. Any monitored communication activity is analyzed against parameters that are predefined to detect a communication attempt by a suspected criminal device to an illicit device. If the communication attempt by the suspected criminal device is detected by the analysis, a communication to the criminal device is controlled so as to delay completion of the communication to the criminal device in order to provide time to locate the criminal device.

14 Claims, 2 Drawing Sheets

(56) References Cited

U.S. PATENT DOCUMENTS

| | | |
|---|---|---|
| 9,525,689 B2 | 12/2016 | Batta et al. |
| 2004/0235453 A1 | 11/2004 | Chen et al. |
| 2005/0060434 A1* | 3/2005 | Fazal ............... H04L 41/12 709/247 |
| 2005/0104731 A1 | 5/2005 | Park |
| 2006/0002331 A1 | 1/2006 | Bhagwat et al. |
| 2006/0128311 A1 | 6/2006 | Tesfai |
| 2007/0063838 A1 | 3/2007 | Yuzik |
| 2007/0271457 A1* | 11/2007 | Patil ................. G06F 21/554 713/166 |
| 2007/0298720 A1* | 12/2007 | Wolman ........... H04L 63/1408 455/66.1 |
| 2008/0172746 A1 | 7/2008 | Lotter et al. |
| 2008/0178294 A1* | 7/2008 | Hu .................... G06F 21/552 726/24 |
| 2008/0291013 A1 | 11/2008 | McCown et al. |
| 2010/0065632 A1* | 3/2010 | Babcock ............ G06Q 10/08 235/385 |
| 2010/0112954 A1 | 5/2010 | Son |
| 2010/0256823 A1 | 10/2010 | Cherukuri et al. |
| 2010/0265121 A1 | 10/2010 | Bandhauer et al. |
| 2010/0287083 A1 | 11/2010 | Blythe |
| 2010/0306105 A1 | 12/2010 | Walker et al. |
| 2011/0191827 A1* | 8/2011 | Balay ................. G06F 17/30 726/4 |
| 2012/0094625 A1* | 4/2012 | Worley .............. H04W 12/12 455/293 |
| 2012/0163206 A1* | 6/2012 | Leung ................ G01S 5/0009 370/252 |
| 2013/0007848 A1 | 1/2013 | Chaskar et al. |
| 2013/0161388 A1 | 6/2013 | Mitchell |
| 2013/0254117 A1 | 9/2013 | Von Mueller et al. |
| 2014/0058854 A1 | 2/2014 | Ranganath et al. |
| 2014/0162598 A1 | 6/2014 | Villa-Real |
| 2014/0279503 A1 | 9/2014 | Bertanzetti et al. |
| 2014/0372305 A1 | 12/2014 | Ray et al. |
| 2015/0082429 A1* | 3/2015 | Rangarajan ........ H04W 12/12 726/23 |
| 2015/0213427 A1* | 7/2015 | Hodges .............. G07F 19/2055 705/18 |
| 2015/0242662 A1 | 8/2015 | Claessen |
| 2015/0281236 A1 | 10/2015 | Batta et al. |

OTHER PUBLICATIONS

Zhao et al., "Card User Awareness Based on Linear Sub-Space Representation," IEEE, pp. 227-232 (2011).

Ogundele et al., "The implementation of a full EMV Smartcard for a Point-of-Sale Transaction," IEEE, pp. 28-35 (2012).

Sakharova, "Payment Card Fraud: Challenges and Solutions," IEEE, pp. 227-234 (Jun. 11-14, 2012).

\* cited by examiner

LOCATING A WIRELESS COMMUNICATION ATTACK

BACKGROUND

A recently growing problem in retail store environments has been the introduction of debit or credit-card skimming devices installed on the store network, such as in point-of-sale terminals for example. These skimming devices can be installed illicitly by criminals to capture the card information of customers as they swipe their card to make a payment to the store. This card information can be transmitted directly to the criminal via, for instance a Short Message Service (SMS) message or a General Packet Radio Service, $3^{rd}$ Generation, Long Term Evolution (GPRS/3G/LTE) data connection, or more typically stored on flash memory in the skimmer device itself, to be retrieved later via a short-range wireless connection such as Bluetooth®. Illegal skimmers using Bluetooth® have been particularly popular with criminals recently because of the low power requirements, reasonable range, and readily available standard circuit chipsets, interoperable devices, and control software.

Presently, store administrators address this problem by walking around the store with a handheld communication device or cellphone, which is Bluetooth® capable, looking (i.e. sniffing) for signals from these illegal skimming devices. This process is time consuming, error prone, expensive, and leaves large periods of time where an unauthorized skimming device can stay active in the store. Moreover, Bluetooth "sniffing" and wireless intrusion protection systems (WIPS) are a new network role that is poorly defined at this time.

Accordingly, there is a need for a technique by which the above described perpetrators of such as attack can be located.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
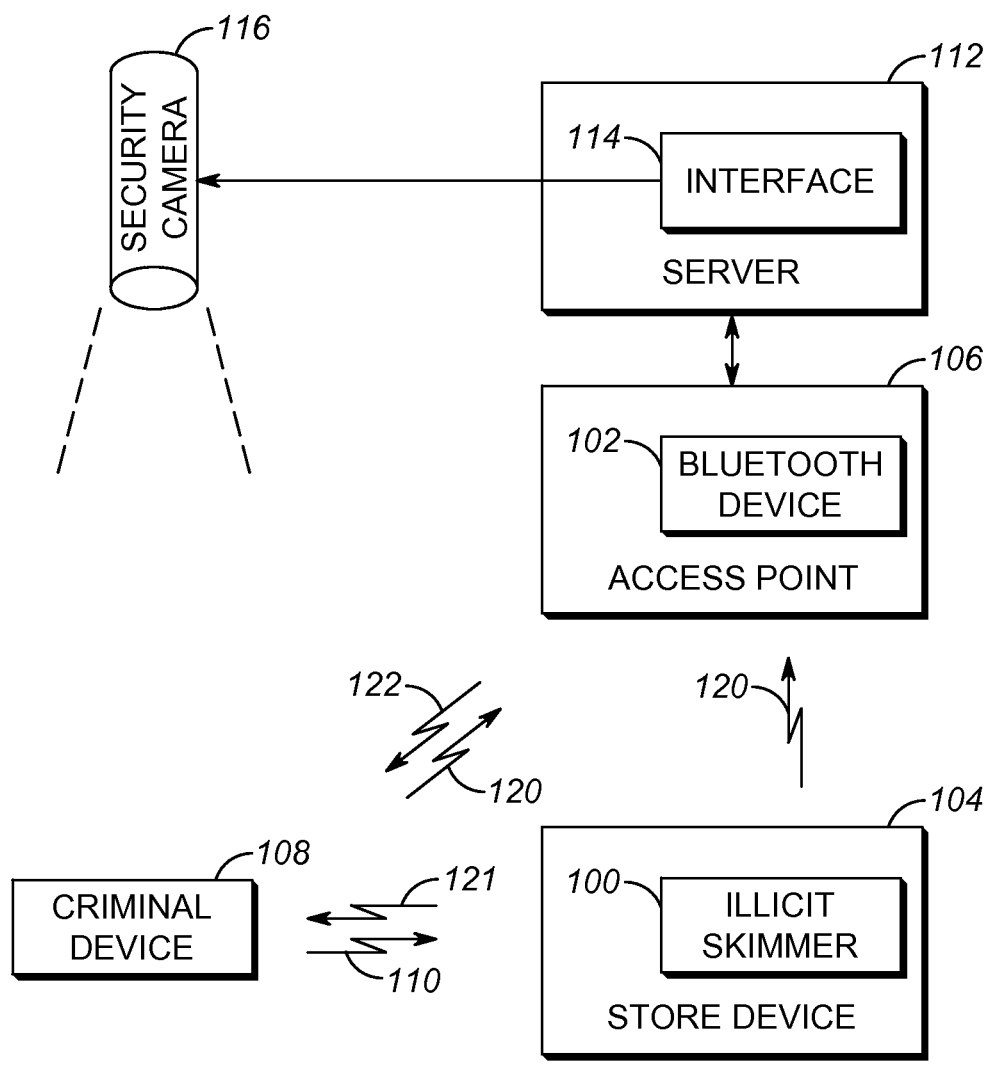
FIG. 1 is a simplified block diagram of a system, in accordance with some embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention describes a technique by which illicit skimmers can be detected, and whereupon perpetrators of such as attack can be located. In particular, the present invention monitors, by a Bluetooth® communication device, communications activity on one or more Bluetooth® communication channels; analyzes, by either the Bluetooth® communication device directly or a central server provided with reports of the monitored communication activity, for detection of a communication attempt to an illicit skimmer that had been installed covertly in the store. In one embodiment, the communication device is a Universal Serial Bus (USB) Bluetooth® module connected to another communication device, such as an existing IEEE 802.11 access point for example, to sniff out communications of illicit information. Upon detecting an illegal communication attempt by a suspected criminal device, the present invention proceeds to control a communication to the criminal device so as to delay completion of the communication to the criminal device in order to increase the likelihood of capturing the perpetrator. Once an illegal skimmer is found, a store administrator can emulate the skimmer, using a greatly lengthened or extended communication, to provide extra time to help locate and capture the perpetuator of the attack, in accordance with the present invention. In one embodiment, the communication can be continuous, presenting an indefinite delay of the completion of the communication.

FIG. 1 is a block diagram depiction of a system that can use various wireless communication technologies, in accordance with the present invention. The wireless systems can include local and wide-area networks, or other IEEE 802.11 wireless communication system. However, it should be recognized that the present invention is also applicable to many various wireless communication systems. For example, the description that follows can apply to one or more communication networks that are IEEE 802.xx-based, employing wireless technologies such as RF, IrDA (infrared), Bluetooth®, ZigBee (and other variants of the IEEE 802.15 protocol), IEEE 802.11 (any variation), IEEE 802.16 (WiMAX or any other variation), IEEE 802.11u (Wi-Fi® certified Passpoint®), IEEE 802.20, Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB, any of which can be modified to implement the embodiments of the present invention. In an exemplary embodiment, the devices and access point herein are preferably compliant with at least the Bluetooth® and IEEE 802.11 specifications.

FIG. 1 shows various entities adapted to support the inventive concepts of the preferred embodiments of the present invention. Those skilled in the art will recognize that FIG. 1 does not depict all of the equipment necessary for system to operate but only those system components and logical entities particularly relevant to the description of embodiments herein. For example, optical systems, tracking devices, servers, and wireless access points can all includes processors, communication interfaces, memories, etc. In general, components such as processors, memories, and interfaces are well-known. For example, processing units are known to comprise basic components such as, but not limited to, microprocessors, microcontrollers, memory cache, application-specific integrated circuits, and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement a processor that performs the given logic. Therefore, the entities shown represent a known system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the correlation and association aspects of the present invention may be implemented in any of the devices listed above or distributed across such components. It is within the contemplation of the invention that the operating requirements of the present invention can be implemented in software, firmware or hardware, with the function being implemented in a software processor (or a digital signal processor) being merely a preferred option.

FIG. 1 is a block diagram of a system for locating a wireless communication attack involving an illicit wireless communication device 100 (e.g. skimmer) and a criminal device 108 (e.g. perpetrators smart phone) for downloading illicit data from the skimmer. As illustrated, the system includes at least one Bluetooth® communication capable device (such as 102 as illustrated connected to an wireless local area network (WLAN such as Wi-Fi®) access point 106 for example) for detecting or sniffing communication activity from the illicit communication device 100 and criminal device. In one embodiment, the Bluetooth® device 102 can be incorporated within a USB module that can attach to an existing USB port of the access point 106. Each access point is a node in the WLAN that connects to a central backend controller, network administrator, or central server 112. The access points are typically fixed nodes of the WLAN that includes the infrastructure elements necessary to enable wireless communications, (i.e., antennas, radio frequency transceivers, and various integrated circuits). The server 112 or backend controller can include an interface 114 to alert a system or store administrator if there is a suspicion that there are illegal devices 108, 100 in the store, and to provide assistance in locating the criminal device and skimmer 100. In one embodiment it is envisioned that an illicit skimmer is a Bluetooth® communication capable device that is connected illegally to a point-of-sale terminal 104, such as a checkout register or an automatic teller machine for example, and can provide illegally obtained debit or credit card information 121 that has been skimmed from the point-of-sale terminal 104 to the criminal device 108, either continuously or by means of a download trigger or other attempt to communicate 110 from the criminal device 108 once the devices are paired. The range of Bluetooth® is limited to about thirty-to-fifty feet (as a typical range). Therefore, to retrieve data off the skimmer device, the criminal attacker needs to come within that distance of the location where the skimmer was installed in the store. Generally, this means that the attacker must enter the premises. In accordance with the present invention, the attacker's stay on the premises is delayed as long as possible when he comes back to retrieve the debit/credit card information that the skimmer has collected on the network. This delay provides a longer opportunity to identify or apprehend this perpetrator.

In practice, the present invention could have a Wi-Fi® access point connected with a Bluetooth® chip, either built into its base board, or connected by a USB module that is plugged into an access point having USB ports available for extended functionality. The access point can keep its Bluetooth® device 102 in a continuous polling mode, for scanning and monitoring for Bluetooth® communications 120 from devices such as the illegal skimmer 100 and criminal device 108. Of course, there may be legitimate Bluetooth® devices in the store, also. Therefore, the present invention provides monitoring functionality to help distinguish between legitimate and illicit Bluetooth® communications 120. Monitoring can be based on a distributed collaborative monitoring architecture that intelligently scans Bluetooth® frequencies over time and space to detect illegal communication devices.

Any Bluetooth® communication that is discovered and monitored in the store is heuristically analyzed by a processor in one or more of the Bluetooth® device 102, access point 106, or server 112 to help determine whether the device sending that Bluetooth® communication is an illegal device and whether an alert or assistance is to be raised to a system administrator, such as on the interface 114 of the central server 112. Analyzing applies various heuristics to determine the probability of whether the device sending that Bluetooth® communication is an illegal communication device and whether the system administrator should be informed. Once an illegal device is suspected through analyzing (signal strength, time of discovery, location, Media Access Control address, type, vendor, etc.), information about that device can be collected or determined and provided for the store administrator. Analyzing can consider several different analysis parameters that are predefined or preconfigured by the store administrator to determine whether to be informed of suspicious activity. These parameters can be used separately or in conjunction with other parameters using a heuristic analysis approach to flag whether an activity may be from a suspected illegal device.

One analysis parameter is whether the device is discoverable. In particular, the monitoring Bluetooth® device 102 detects other Bluetooth® devices (i.e. 100) that are in discoverable mode. This could indicate an illegal skimmer inasmuch as many of the skimmers that are sold by the people who develop them are set in discoverable mode by default, and the users who actually end up using these devices to skim debit or credit card data typically do not care about the configuration of the device as long as they follow the simple steps to install them on a compromised point-of-sale terminal. Therefore, these illegal devices generally can show up in discoverable mode (the default configuration) whereas legitimate devices are typically found in paired-mode with other devices in the store. This parameter is not used as a definitive test for illegal skimmers since some legitimate devices can also be found in discoverable mode. However, this test provides a benefit in that discoverable devices can be scanned and detected much quicker than non-discoverable devices. An alert could be generated for any discoverable devices found, depending on system administrator preferences.

Another analysis parameter is whether a device is in a non-discoverable mode. Most typical legitimate devices are in paired mode or possibly discoverable modes, whereas finding a device in non-discoverable mode raises a red flag. If a device is not in discoverable mode, the only way to 'talk' to it is to know its Media Access Control (MAC) address. Since a store administrator will not know device MAC addresses in advance, the administrator would have to guess the MAC address. The complete MAC address field is quite large (six bytes) but it has three bytes of vendor info for which the administrator can use a known subset and then cycle through all the values of the bottom three bytes to find any non-discoverable devices. In this way, the present invention "brute-forces" the MAC address of the sniffer device 102 to be able to talk to and discover an illegal skimmer that is otherwise hidden from the system administrator. For any non-discoverable devices that are found, an alert could be generated.

Another analysis parameter is the type of data within a monitored Bluetooth® communication. If data from the communications activity is recognized as including a series of sixteen-digit card numbers with associated expiration dates, this is a strong indicator that the system administrator should be alerted. In addition, information that relates to debit or credit card transaction logging information such as a series of dates, time-stamps, and the like, are also strong red flags for sending an alert. In addition, Bluetooth® devices can advertise their class of operation (audio/networking/phone/imaging miscellaneous, etc.) and for devices such as illegal skimmers these fields usually will be set to a default (i.e. miscellaneous) which can again be a trigger to flag a potentially suspect device, for warning the system administrator.

Another analysis parameter is Bluetooth® communication activity that coincides with updates from a point-of-sale terminal. For example, each time there is a person using the point-of-sale terminal, if a corresponding Bluetooth® data transfer is noted at the same time, this is a suspected transaction that is a red flag for sending an alert.

Another analysis parameter is how long a Bluetooth® communication session is conducted. If the continuous communication time exceeds a predetermined time limit than an alert could be generated. For example, if a device communication is monitored in a Bluetooth® session for a short period, that device could be a phone, headset or other Bluetooth device being used by a store customer. However, if the monitored communications activity is longer compared to normal communications activity, then an alert could be generated. For example, if communication activity is seen in the store, say for six hours continuously, then it is likely that the communication is illicit and the system administrator should be alerted. In another example, if an exceedingly long data connection between two devices in the exact same location (and therefore not someone moving around), with continuous short bursts of information (unlike a video or audio stream) going on for say an hour would be a suspected event. Although such communication could still be legitimate, the administrator can be alerted to investigate.

Another analysis parameter is time of day. If a Bluetooth® communication is monitored in the store while the store is closed, then it is likely that the system administrator should be alerted.

Another analysis parameter is when the communication is first monitored. If the first time that a particular Bluetooth® communication occurs is outside of regular store hours, then it is likely that the system administrator should be alerted.

Some of the above parameters are stronger than others for indicating the presence of an illegal skimming device. Therefore, the store administrator can employ a heuristic analysis approach to set preferences for triggers for those parameters, or those combinations of parameters, that will trigger an alert indication. These preferences could be set manually or determined automatically in a dynamic fashion using empirical data. Moreover, parameters can be given different weightings for consideration in generating an alert. For example, finding a device in non-discoverable mode could be given a higher weighting than finding a device in discoverable mode.

In accordance with some embodiments, the WLAN system includes access points 106 with special firmware allowing radio frequency (RF) capture of Bluetooth® communications from its coupled Bluetooth® device 102, which can be operated as dedicated Bluetooth® sensor or discrete sniffer that captures and analyzes frames over the Bluetooth® air interface. The access point and associated Bluetooth® device 102 can listen to all transmitted Bluetooth® packets 120 using an intelligent channel scanning algorithm to detect traffic across the operational Bluetooth® spectrum. The access point and Bluetooth® device 102 can locally analyze all the received packets, collect several statistics and events of interest, and communicate selected events and statistics over a link to the central server 112 within the WLAN system. Alternatively, the access point and Bluetooth® device 102 can supply raw traffic data to the server for analysis. The access point 106 and server 112 can be connected using a wired or wireless network connection. For example, the network interface could be wired (e.g. Ethernet, Cable, Digital Subscriber Line (DSL), and the like) or wireless (Wi-Fi, WiMAX, Cellular, and the like), allowing communication with the server or other devices.

The system architecture is such that analysis functionality can be adaptively shifted between the access point 106 and server 112. The server 112 can ask the access point 106 to process more events and statistics and provide a consolidated analysis periodically. The server 112 can also ask the access point 106 to provide a real-time feed of all packets the Bluetooth® device 102 is monitoring at any given time. The server 112 also provides a centralized repository to store observed events and statistics.

The access point 106 includes a radio, a processor, memory (volatile and non-volatile), a network interface to communicate with the server and/or other devices, and an optional Global Positioning System (GPS) receiver allowing it determine its physical location if its location is not already predetermined. Alternatively, if the access point is fixed, the access points and/or the server can be programmed with their location data. Therefore, given access point location data and either signal strength or time of arrival data, a location of the illegal device can be determined using techniques known in the art, such as triangulation or trilateration, and can be provided to the store administrator to assist in locating either of the devices.

Once any of the above techniques have been used to identify and locate the illicit skimmer device 100, then attention shifts to finding the criminal device of the perpetrator when the perpetrator attempts to download information from the skimmer. To accomplish this, the skimmer device can be disabled or left in place, in accordance with the system administrator's discretion. If disabled, the system administrator can use one of the Bluetooth® devices 102 to emulate the disabled and removed skimmer device 100. In this way, the administrator's device can pair and communicate 122 with the criminal device 108 in a safe and controlled fashion when the perpetrator enters the premises. Alternatively, if discovered skimmer device is left in place, the administrator's device can interfere with the communication 121 to not only prevent the download of information but also to delay the download to provide time to help catch the perpetrator.

In operation, once the present invention has discovered an identity of an illicit skimmer (i.e. a MAC address and/or Bluetooth® ID discovered using the brute-force methods described above for example) this identity information can then be defined as parameters to be used to locate a perpetrator's criminal device. In particular, the present invention will analyze any monitored communication activity against parameters that are predefined to detect a communication attempt by a suspected criminal device to its illicit skimmer device. Specifically, the Bluetooth® device 102 can sniff Bluetooth® packets of any communications to see if any are addressed to the discovered identity of the skimmer device. Such communication would occur when the criminal device attempts to communicate with the skimmer device. Any detection of packets containing the identity of the skimmer device would flag a sending device as being suspect. If the communication attempt by the suspected criminal device is detected by the processor, the present invention can then control a communication to the criminal device so as to delay completion of the communication to the criminal device. There are different ways this delay can be realized.

In one embodiment, a discovered illicit device can be removed and then emulated by a processor and Bluetooth® device 102 or order to assume the identity of illicit device. When a criminal device attempts to pair with its illicit skimmer it will instead pair with the emulating device, whereupon the emulating device can begin communicating with the criminal device. The emulating device can periodically break a connection during this communication with the criminal device. A broken connection will force the criminal device to re-connect with the emulating device to begin the download over again. The connection can be broken by either slowing down communication excessively or periodically halting communications. The actual data provided during communication can be false.

In another embodiment, a discovered illicit device can be left in place. When a criminal device attempts to pair with its illicit skimmer this attempt can be detected by the Bluetooth® device sniffing packets containing the known skimmer identity. After a connection is made, the Bluetooth® device can be directed by a processor to periodically break this connection by sending data during this communication with the criminal device in order to force a collision of data. This forces the connection between the skimmer device and criminal device to be interrupted, whereupon these devices must then reconnect and then restart the download of data. Of course this can be repeated to extend the communication delay for a considerable amount of time.

Another embodiment uses the emulated device as explained and operated before. In this case, the Bluetooth® device 102 is supplied with a set of false data by a processor. The set of false data is of a far greater size than any existing or normal data that would have been found on the skimmer device, so that the communication transfer takes a long time to complete the download of data. In any of the above examples, while the criminal device is being delayed in trying to complete the download of data, the system can then use various locationing techniques in order to apprehend the perpetrator of the attack who is using the criminal device.

For example, multiple communications monitors can be provided to monitor the communications activity. If communications addressed to the illicit device from the criminal device is identified, the multiple communications monitors are operable to supply signal strength measurements of the identified communications, such that a trilateration or triangulation technique can use the supplied signal strengths to locate the criminal device. An interface communicatively coupled to the processor or Bluetooth device is operable to generate assistance for a system administrator to locate the criminal device.

In another example, the interface can be coupled to a security camera 116 observing a vicinity near the skimmer. The security camera can record people within the vicinity of the illicit device, in order to associate and identify a particular person to the communication attempt by the criminal device to the skimmer.

In yet another example, the sniffing Bluetooth® device 102 will not only discover the identity of packets addressed to the illicit device in sniffed from, these frames will also contain the MAC address of the source device (i.e. the criminal device) that is sending the packets. Once the Bluetooth® MAC address of the attacking criminal device is known, the access point can scan for IEEE 802.11 communication having a MAC address that is +/−1 of the Bluetooth® Media Access Control address, which can be used to identify the criminal device. For example, vendors such as Apple® use successive MAC addresses for Bluetooth and Wi-Fi interfaces on their iPhone®. Therefore, if a Wi-Fi MAC address is found that is within one of a discovered Bluetooth® MAC address of the criminal device, then this Wi-Fi MAC address can also be used to identify the attacker's device, whereupon exiting Wi-Fi records could help to identify and locate the perpetrator.

Figure 2:
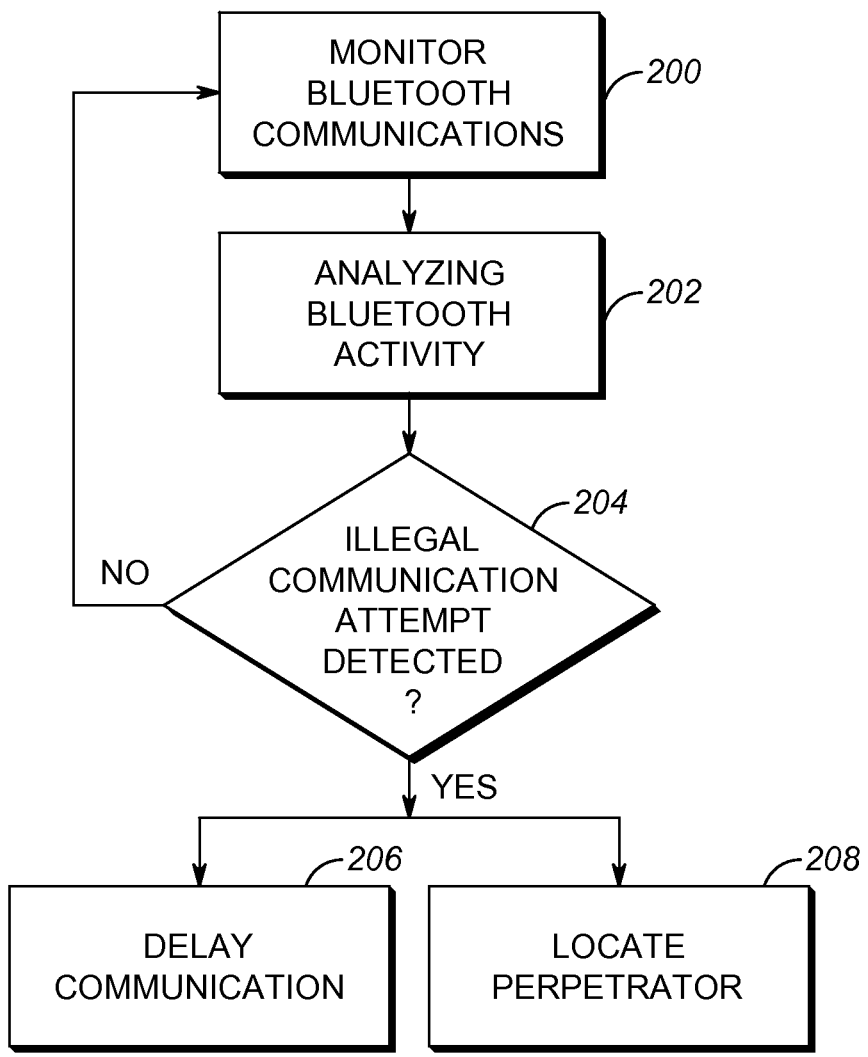
FIG. 2 illustrates a flow chart of a method, in accordance with some embodiments of the present invention.

FIG. 2 is a flowchart illustrating a method for locating a wireless communication attack.

As illustrated, the method begins with monitoring 200 of Bluetooth® communications activity with at least one Bluetooth® capable communication device over the Bluetooth® spectrum.

A next step includes analyzing 202 any monitored Bluetooth® communication activity against parameters that are predefined to detect a communication attempt by a suspected criminal device to an illicit device. The particular parameters used have been described previously. Heuristic analyzing can be done by a processor within the communication device, access point, or can be supplied to a central server. If supplied to a central server, the server can aggregate activity data from various communication devices, maintain a centralized forensic record of events and statistics, and run various tests to detect criminal activity, policy violations, known attacks, protocol violations, and anomalous behavior.

If the communication attempt by the suspected criminal device is detected 204 by the analyzing step, the operation continues to the next step of controlling a communication to the criminal device so as to delay 206 completion of the communication to the criminal device. While the communication is being delayed an attempt is made to locate 208 the perpetrator as described previously.

Advantageously, the present invention ensures that even if an attacker reaches out from a distance to attempt to download data from an illicit skimmer, assistance can be provided to help delay the download in order to provide time to help locate, identify, and possibly capture the perpetrator of the attack.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus for detecting a presence of an illicit skimmer device configured to capture customer data, comprising:
   a communication monitor including a wireless sensor configured to monitor communication activity by capturing frames over a wireless air interface;
   a hardware processor communicatively coupled with the communication monitor and configured to analyze the frames for a presence of a predefined communication parameter associated with a communication from the illicit skimmer device over a short-range wireless connection, the hardware processor further being configured to delay a completion of the communication from the illicit skimmer device to a criminal device; and
   an interface communicatively coupled with the hardware processor and configured to generate an alert for a system administrator when the hardware processor detects a presence of the predefined communication parameter, the predefined communication parameter represented by at least one of:
   the frames being sent by a device over the short-range wireless connection, and one of:
   the device is in a discoverable mode, or
   the device is in a non-discoverable mode, and the frames are sent in response to a brute-force inquiry;
   the frames including a series of sixteen-digit numbers;
   a transmission of the frames coincides with updates from a point-of-sale terminal;
   the frames are transmitted continuously for a duration that is greater than a predetermined duration threshold; and
   the frames are first transmitted during a predefined time range,
   wherein the illicit skimmer device is separate from the criminal device, and
   wherein the communication from the illicit skimmer device to the criminal device takes place via the short-range wireless connection upon a pairing of the illicit skimmer device with the criminal device.

2. The apparatus of claim 1, wherein, the hardware processor is further configured to emulate the communication from the illicit skimmer device to the criminal device.

3. The apparatus of claim 2, wherein the emulated communication includes false data having a predetermined size.

4. The apparatus of claim 1, wherein the communication monitor is configured to supply a signal strength measurement associated with the communication from the illicit skimmer device.

5. The apparatus of claim 1, wherein the interface is coupled to a security camera directed to observe a vicinity near the illicit skimmer device.

6. The apparatus of claim 1, wherein the hardware processor is further configured to discover a first Media Access Control address of the criminal device from the frames, and discover a second Media Access Control address of the criminal device by scanning for a wireless device having a Media Access Control address that is within +/−1 of the first Media Access Control address.

7. A system for detecting a presence of an illicit skimmer device configured to capture customer data, comprising:
- a communication monitor including a wireless sensor configured to monitor communication activity by capturing frames over a wireless air interface;
- a hardware processor communicatively coupled with the communication monitor and configured to analyze the frames for a presence of a predefined communication parameter associated with a communication from the illicit skimmer device over a short-range wireless connection, the hardware processor further being configured to delay a completion of the communication from the illicit skimmer device to a criminal device;
- an interface communicatively coupled with the hardware processor and configured to generate an alert for a system administrator when the hardware processor detects a presence of the predefined communication parameter, the predefined communication parameter represented by at least one of:
  - the frames being sent by a device over the short-range wireless connection, and one of:
    - the device is in a discoverable mode, or
    - the device is in a non-discoverable mode, and the frames are sent in response to a brute-force inquiry;
  - the frames including a series of sixteen-digit numbers;
  - a transmission of the frames coincides with updates from a point-of-sale terminal;
  - the frames are transmitted continuously for a duration that is greater than a predetermined duration threshold; and
  - the frames are first transmitted during a predefined time range,
- wherein the illicit skimmer device is separate from the criminal device, and
- wherein the communication from the illicit skimmer device to the criminal device takes place via the short-range wireless connection upon a pairing of the illicit skimmer device with the criminal device.

8. The system of claim 7, wherein, the hardware processor is further configured to emulate the communication from the illicit skimmer device to the criminal device.

9. The system of claim 8, wherein the emulated communication includes false data having a predetermined size.

10. The system of claim 7, wherein the communication monitor is configured to supply a signal strength measurement associated with the communication from the illicit skimmer device.

11. The system of claim 7, wherein the interface is coupled to a security camera directed to observe a vicinity near the illicit skimmer device.

12. The system of claim 7, wherein the hardware processor is further configured to discover a first Media Access Control address of the criminal device from the frames, and discover a second Media Access Control address of the criminal device by scanning for a wireless device having a Media Access Control address that is within +/−1 of the first Media Access Control address.

13. A method of detecting a presence of an illicit skimmer device configured to capture customer data, the method comprising the steps of:
- monitoring, by a communication monitor that includes a wireless sensor, communication activity by capturing frames over a wireless air interface;
- analyzing, by a hardware processor communicatively coupled with the communication monitor, the frames for a presence of a predefined communication parameter associated with a communication from the illicit skimmer device over a short-range wireless connection;
- detecting, by the hardware processor, a presence of the predefined communication parameter, the predefined communication parameter represented by at least one of:
  - the frames being sent by a device over the short-range wireless connection, and one of:
    - the device is in a discoverable mode, or
    - the device is in a non-discoverable mode, and the frames are sent in response to a brute-force inquiry;
  - the frames including a series of sixteen-digit numbers;
  - a transmission of the frames coincides with updates from a point-of-sale terminal;
  - the frames are transmitted continuously for a duration that is greater than a predetermined duration threshold; and
  - the frames are first transmitted during a predefined time range;
- delaying, by the hardware processor, a completion of the communication from the illicit skimmer device to a criminal device; and
- generating, by an interface communicatively coupled with the hardware processor, an alert for a system administrator upon the detection of the presence of the predefined communication parameter,
- wherein the illicit skimmer device is separate from the criminal device, and
- wherein the communication from the illicit skimmer device to the criminal device takes place via the short-range wireless connection upon a pairing of the illicit skimmer device with the criminal device.

14. The method of claim 13, further comprising the step of emulating the communication from the illicit skimmer device to the criminal device.

* * * * *